United States Patent [19]
La Court

[11] Patent Number: 5,731,088
[45] Date of Patent: Mar. 24, 1998

[54] MULTILAYER POLYIMIDE-FLUOROPOLYMER INSULATION HAVING SUPERIOR CUT-THROUGH RESISTANCE

[75] Inventor: Philip R. La Court, Chillicothe, Ohio

[73] Assignee: E. I. du Pont de Nemours and Company, Wilmington, Del.

[21] Appl. No.: 657,292

[22] Filed: Jun. 4, 1996

[51] Int. Cl.⁶ ................................................ B32B 27/00
[52] U.S. Cl. ........................ 428/421; 428/422; 428/473.5
[58] Field of Search ............................ 428/421, 422, 428/473.5

[56] References Cited

U.S. PATENT DOCUMENTS

| | | | |
|---|---|---|---|
| 5,106,673 | 4/1992 | Effenberger et al. | 428/216 |
| 5,220,133 | 6/1993 | Sutherland et al. | 174/120 R |
| 5,380,820 | 1/1995 | Ohta et al. | 528/353 |
| 5,399,434 | 3/1995 | Katz et al. | 428/421 |

Primary Examiner—Helen Lee

[57] ABSTRACT

A multilayer polyimide-fluoropolymer insulation structure containing (a) a layer of a polyimide-fluoropolymer composite composed of a polyimide copolymer base layer, fluorinated ethylene-propylene (FEP) copolymer layers bonded to both sides of the polyimide copolymer base layer and a FEP-polytetrafluoroethylene (PTFE) blend layer bonded to at least one of the FEP layers and (b) an overlying layer of unsintered PTFE. The insulation structure has superior cut-through resistance when used in aerospace wire and cable applications.

10 Claims, 2 Drawing Sheets

MULTILAYER POLYIMIDE-FLUOROPOLYMER INSULATION HAVING SUPERIOR CUT-THROUGH RESISTANCE

FIELD OF THE INVENTION

The present invention relates to a multilayer polyimide-fluoropolymer insulation structure having superior cut-through resistance, while still maintaining good arc tracking resistance, when used in aerospace wire and cable applications. More specifically, the invention relates to a multilayer polyimide-fluoropolymer insulation construction consisting of (a) a layer of a polyimide-fluoropolymer composite composed of a polyimide copolymer base layer, fluorinated ethylene-propylene (FEP) copolymer layers bonded to both sides of the polyimide copolymer base layer, and a FEP-polytetrafluoroethylene (PTFE) blend layer bonded to at least one of the FEP layers; and (b) an overlying layer of unsintered PTFE.

BACKGROUND OF THE INVENTION

High temperature wire and cable insulation, in particular, insulation for aerospace wire and cable, requires a combination of excellent electrical properties, chemical resistance, fire retardance, stripability, arc-track propagation resistance and good endurance properties, such as cut-through resistance.

High temperature wire and cable insulation based on polyimides, such as Kapton® polyimide, generally have a very desirable balance of high temperature properties, excellent fire retardance and good electrical and endurance properties. However, under some conditions polyimide-containing constructions can arc-track, resulting in the formation of a carbonaceous char. Arc tracking is a catastrophic failure of the insulation in the presence of an electrical arc when a short circuit occurs between the conductor and a conducting medium external to the insulation, such as a moderately conductive fluid. Such a failure causes mechanical damage to the insulation which rapidly propagates at the elevated temperature of the electrical arc.

Fluoropolymers, such as PTFE and copolymers of TFE and hexafluoropropylene (Teflon® FEP), have excellent electrical properties, including a very low tendency to arc track. However, such fluoropolymers are generally soft and are prone to cut-through particularly at the elevated temperatures where the insulation constructions are used in aerospace applications.

Insulating composites are known which incorporate layers of polyimide resins, such as Kapton® polyimide, as well as fluoropolymers such as FEP or PTFE to provide a hybrid wire insulation construction whose exterior exhibits the good chemical resistance and dielectric properties of the fluoropolymer but whose polyimide interior does not provide the requisite mechanical toughness required for imparting good cut-through resistance at elevated temperatures.

For example, insulated conductors are known which have hybrid polyimide-fluoropolymer insulation which is satisfactory for use at the relatively high temperatures, i.e. 200° C. and higher, required in aerospace applications. One such insulated conductor is described in Military Specification MIL-W-81381/9 and comprises a 20 AWG two layer construction with a topcoat. The conductor used in this construction is a high strength silver plated stranded conductor consisting of 19 strands of 32 AWG single conductor wire. The layer next to the conductor consists of 2 mils of Kapton® polyimide laminated on one side with 0.50 mil of Teflon® FEP which is applied onto the wire with a minimum 50% overlap. In this particular construction the polyimide is next to the conductor. The second layer, which is applied over the first layer with a minimum 50% overlap, consists of 1 mil of Kapton® polyimide laminated on both sides with 0.10 mil of Teflon® FEP. The two layer construction is over-coated with a polyimide resin coating which may contain pigments to provide color identification and to smooth and protect the layers from the environment.

Another insulated conductor is described in Military Specification MiL-W-22759/34 and comprises the same conductor used in MIL-W-81381/9 insulated with two extruded layers of irradiated, cross-linked, ethylenetetrafluoroethylene copolymer (ETFE).

Both of the above-described insulated conductors, however, exhibit an inverse relationship between the test temperature and the dynamic cut-through resistance as shown in FIGS. 1 and 2 (see Examples 1C and 2C). As a result, many current wire specifications specify the minimum cut-through resistance values obtainable at several temperatures in order to insure adequate insulation performance.

U.S. Pat. No. 5,106,673, issued on Apr. 21, 1992 to Effenberger et al. discloses a multilayer laminar structure having improved adhesion and arc-tracking resistance comprising a polyimide base layer, inner layers of PTFE/FEP blend adhered to both sides of the polyimide base layer and outer layers of PTFE adhered to both inner PTFE/FEP blend layers.

U.S. Pat. No. 5,220,133, issued on Jun. 15, 1993 to Sutherland et al. discloses an insulated conductor having improved arc-track resistance properties wherein the insulation consists of a first layer of a composite of a polyimide between two layers of polytetrafluoroethylene and a second overlying layer of unsintered polytetrafluoroethylene.

The above-mentioned U.S. patents specifically teach that layers of PTFE or PTFE-FEP blends provide greater adhesion than FEP alone when used to bond the polyimide layer and the outer PTFE layers. In contrast, the multilayer polyimide-fluoropolymer insulation structure of the present invention requires an FEP layer and not a PTFE or PTFE/FEP blend layer to bond the polyimide to the PTFE/FEP layers. Outer FEP layers can also be used to provide excellent film-to-film adhesion during the wrapping and heat-sealing process and good stripability from the conductor.

U.S. Pat. No. 5,399,434, issued to Katz et al on Mar. 21, 1995, discloses a high temperature polyimide-fluoropolymer laminar structure for use as an aerospace wire and cable insulation consisting of a polyimide core layer derived from pyromellitic dianhydride and 4,4'-diaminodiphenylether (Kapton® polyimide film), inner FEP copolymer layers, intermediate PTFE/FEP copolymer blend layers and outer FEP copolymer layers. These laminar structures provide satisfactory arc-track resistance but are deficient in cut-through resistance at the elevated temperatures used in aerospace applications.

Thus, a need still exists for an improved polyimide-fluoropolymer insulation structure for use in aerospace applications having superior cut-through resistance at elevated temperatures but maintaining the good arc-track resistance properties of conventional polyimide-fluoropolymer insulation structures.

SUMMARY OF THE INVENTION

Figure 1:
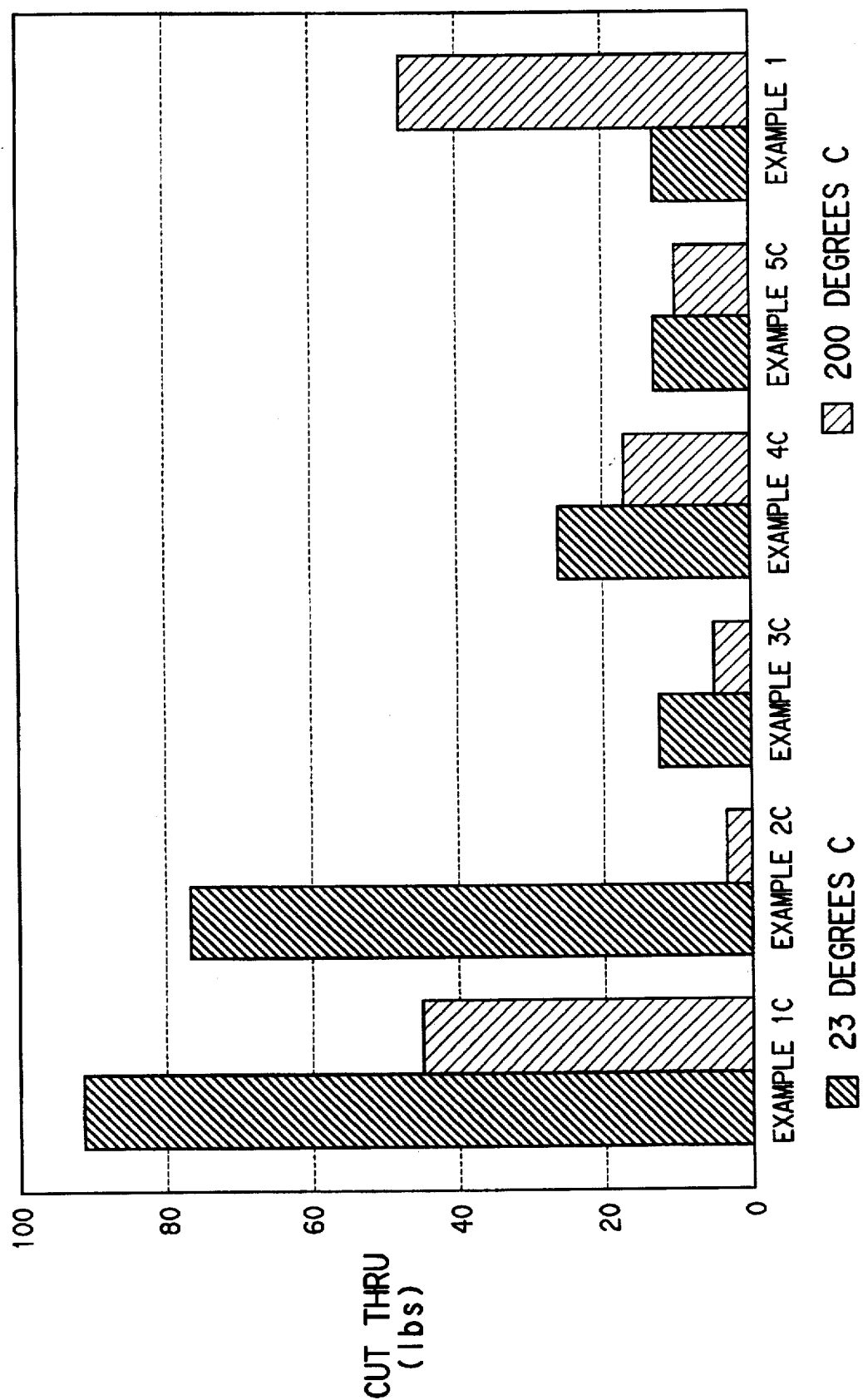
FIGS. 1 and 2 provide a comparison of the dynamic cut-through resistance of aerospace wire polyimide-fluoropolymer hybrid insulation constructions of the present invention with those of the prior art.

According to the present invention, there is provided a multilayer polyimide-fluoropolymer insulation structure having superior cut-through resistance comprising:
(a) a first layer of a polyimide-fluoropolymer composite consisting essentially of:
  (i) a polyimide copolymer base layer consisting essentially of from 0 to 95 mole % of 3,3'4,4'-biphenyltetracarboxylic dianhydride, from 5 to 100 mole % of pyromellitic dianhydride, from 25 to 95 mole % of p-phenylenediamine and from 5 to 75 mole % of a diaminodiphenylether;
  (ii) a layer of a fluorinated ethylenepropylene copolymer (FEP) bonded to both sides of the polyimide copolymer base layer; and
  (iii) a layer of a blend of polytetrafluoroethylene polymer (PTFE) and fluorinated ethylene-propylene copolymer (FEP) bonded to the exposed side of one of the fluorinated ethylene-propylene copolymer (FEP) layers (ii); and
(b) a second layer overlaying said first composite layer (a) of unsintered polytetrafluoroethylene (PTFE).

In another embodiment of the invention, blend layers (iii) of polytetrafluoroethylene polymer (PTFE) and fluorinated ethylene-propylene copolymer (FEP) can be bonded to the exposed sides of both of the fluorinated ethylene-propylene copolymer (FEP) layers (ii) and additional layers (iv) of fluorinated ethylenepropylene copolymer (FEP) can be bonded to the exposed sides of both of the polytetrafluoroethylene polymer (PTFE)-FEP blend layers (iii).

Insulation tapes for wire and cable made using the multilayer polyimide-fluoropolymer structure of the invention are particularly useful in aerospace applications, since they exhibit superior cut-through resistance at elevated temperatures (200° C.) when compared to similar prior art polyimide-fluoropolymer insulation structures.

DETAILED DESCRIPTION OF THE INVENTION

The multilayer polyimide-fluoropolymer insulation structure of the invention is prepared by coating a polyimide copolymer film, which serves as the base layer, on both sides with a fluorinated ethylene-propylene copolymer (FEP) adhesive layer; coating at least one of the FEP adhesive layers with a layer of a blend of polytetrafluoroethylene (PTFE) and fluorinated ethylene-propylene copolymer (FEP); optionally, coating the PTFE-FEP blend layers with adhesive layers of FEP copolymer; overlaying the thus formed polyimide-fluoropolymer composite layer with a layer of unsintered polytetrafluoroethylene; and finally heat-sealing the successive layers to form the multilayer polyimide-fluoropolymer structure.

The polyimide copolymer used as the base layer of the composite is a high strength polyimide copolymer, which when used in hybrid wire constructions, provides excellent wire insulation properties including high room temperature (23° C.) cut-through resistance and increased cut-through resistance at elevated temperature (200° C.) while still maintaining excellent arc-track resistance properties. Hybrid polyimide-fluoropolymer wire constructions of the present invention have cut-through resistance values of at least 15 lbs., preferably at least 25 lbs. at 23° C. and from 20 lbs. up to almost 50 lbs. at 200° C. Arc tracking propagation failures of the wire constructions correspond to less than five failures out of 75 wire construction samples tested.

The polyimide copolymer film is derived from the reaction of an aromatic tetracarboxylic acid dianhydride component consisting of from 0 to 95 mole %, preferably from 10 to 95 mole %, of 3,3'4,4'-biphenyltetracarboxylic dianhydride and from 5 to 100 mole %, preferably from 5 to 90 mole %, of pyromellitic dianhydride, and an aromatic diamine component consisting of from 25 to 99 mole %, preferably from 40 to 98 mole %, of p-phenylene diamine and from 1 to 75 mole %, preferably from 2 to 60 mole %, of a diaminodiphenyl ether such as 4,4'-diaminodiphenyl ether, 3,3'-diaminodiphenyl ether or 3,4'-diaminodiphenyl ether.

The optimum properties of the polyimide copolymer film used in the present invention include an elongation at break of greater than 40%, a Young's Modulus of greater than 650 Kpsi and a tensile strength of greater than 40 Kpsi.

A particularly preferred polyimide copolymer film for use in the present invention is derived from 40 mole % of 3,3',4,4'-biphenyltetracarboxylic dianhydride, 60 mole % of pyromellitic dianhydride, 60 mole % of p-phenylenediamine and 40 mole % of 4,4'-diaminodiphenyl ether. In another preferred embodiment of the invention, the polyimide copolymer is derived from 100 mole % of pyromellitic dianhydride, 60 mole % of p-phenylenediamine and 40 mole % of 4,4'-diaminodiphenyl ether.

For aerospace applications, the thickness of the polyimide copolymer film base layer ranges from 0.30 to 5.0 mils, preferably from 0.30 to 3.0 mils.

The fluorinated ethylene-propylene copolymer (FEP) layers are coated on both sides of the polyimide copolymer base layer as an aqueous dispersion of a colloidal FEP copolymer. The coated polyimide copolymer film is then heated at from 325° C. to 450° C., preferably from 370° C. to 450° C., for from 0.25 to 5 minutes. The FEP layers formed on the polyimide copolymer base layer each have a final thickness ranging from 0.02 to 0.20 mil, preferably from 0.05 to 0.10 mil. The layer of FEP copolymer contains from 50% to 95% of tetrafluoroethylene and from 5% to 50%, preferably from 7% to 27%, of hexafluoropropylene. The FEP copolymers are extensively described in U.S. Pat. Nos. 2,833,686 and 2,946,763.

The FEP coating provides excellent bonding of the polyimide copolymer base film layer to the subsequently applied PTFE-FEP blend layers. Without the FEP coating, the PTFE-FEP blend layers do not bond very well to the polyimide copolymer base layer unless the proportion of FEP in the blend is at least about 50%. However, the FEP layers have been found to provide excellent bonding of the PTFE-FEP blend layers to the polyimide copolymer base layer, even when the PTFE-FEP copolymer blend ratio is as much as 90 to 10.

A layer of a PTFE-FEP blend is subsequently applied to one or both of the FEP layers as a colloidal aqueous dispersion having a solids content of from 5 to 60%. The coated film is then heated at 350° C. to 500° C. for from 0.50 to 5 minutes. The thickness of the PTFE-FEP layers range from 0.05 to 1.0 mil, preferably from 0.25 to 0.55 mil. In order to achieve good arc-track resistance, the PTFE-FEP blend must contain at least 40 weight % and, preferably up to 90 weight %, of the PTFE homopolymer. A preferred PTFE-FEP blend contains from 50 to 90 weight % PTFE and from 10 to 50 weight % of FEP.

Although not specifically required, outer layers of FEP copolymer can also be applied over the PTFE-FEP blend layers to bond the composite insulation structure to itself during the tape overlapping which occurs during the taping of the conductor. The overlap is generally 50%, or greater, of the tape width. The outer FEP copolymer layers have a thickness ranging from 0.02 to 0.15 mil, preferably from 0.03 to 0.06 mil. The outer FEP layers provide good adhesive bonding to the subsequently applied unsintered PTFE layer used in the wire construction.

The polyimide-fluoropolymer composite is preferably slit into narrow widths to provide tapes. A layer of composite tape is wound around an electrical conductor in spiral fashion and overlapped on itself. The amount of overlap can vary, depending on the angle of wrap. The tension employed during the wrapping operation can also vary widely ranging from just enough tension to prevent wrinkling to a tension high enough to stretch and neck down the tape. Even when the tension is low, a snug wrap results since the tape shrinks to a certain extent under the influence of heat during the ensuing heat-sealing operation.

A layer of unsintered polytetrafluoroethylene tape is spirally wrapped around the composite polyimide-fluoropolymer tape layer with a minimum overlap of 50% of the tape width to form a two tape construction. The tapes are then sealed and sintered by heating the tape-wrapped conductor at a temperature and for a time sufficient to fuse the fluoropolymer layers. The sealing temperatures required can range from 240° C. to 500° C., depending on the insulation thickness, the gauge of the metal conductor, the speed of the production line and the length of the sealing oven.

The principle and practice of the present invention will now be illustrated by the following examples which are provided to illustrate the practice and use thereof.

EXAMPLES 1 to 3 (COMPARATIVE EXAMPLES 1C to 6C)

The insulation tapes described in the following examples were wrapped on the conductor wire using a standard wire wrapping machine such as can be purchased from the EJR Engineering Company, Inc., Lowell, Mass.

The tape constructions were sealed and sintered in a radiant-heated convection oven purchased from the EJR Engineering Company, Inc., Lowell, Mass. at 300° to 425° C. for from 0.5 to 2.0 minutes.

In all cases, the conductive wire samples were wrapped with the specified tapes and then sintered and sealed in a subsequent heat-sealing operation. In an alternate method of manufacture, the sintering and sealing operation could also be incorporated with the taping operation.

The wire insulations were tested for dynamic cut-through resistance using the method described in ASTM-D-3032, Section 22. The dynamic cut-through test measures the resistance of a wire insulation to the penetration of a cutting surface and simulates the type of damage that can occur when a wire is forced by mechanical loading against a sharp edge. The test was performed at room temperature (23° C.) and at 200° C. to evaluate the effect of elevated temperature on insulation performance. The standard cutting edge used was a 90 degree hardened steel blade having a radius of 0.005 inch. Insulated wire specimens were placed on a support anvil and the cutting edge was oriented perpendicularly to the axis of the specimen. The cutting edge was forced through the insulation at a constant rate of 5 mm per minute until contact with the conductor occurred. A detection circuit sensed contact of the cutting edge with the metallic conductor and recorded the maximum force encountered during the test. The reported cut-through resistance was the arithmetic mean of eight tests performed on each insulation specimen.

Figure 2:
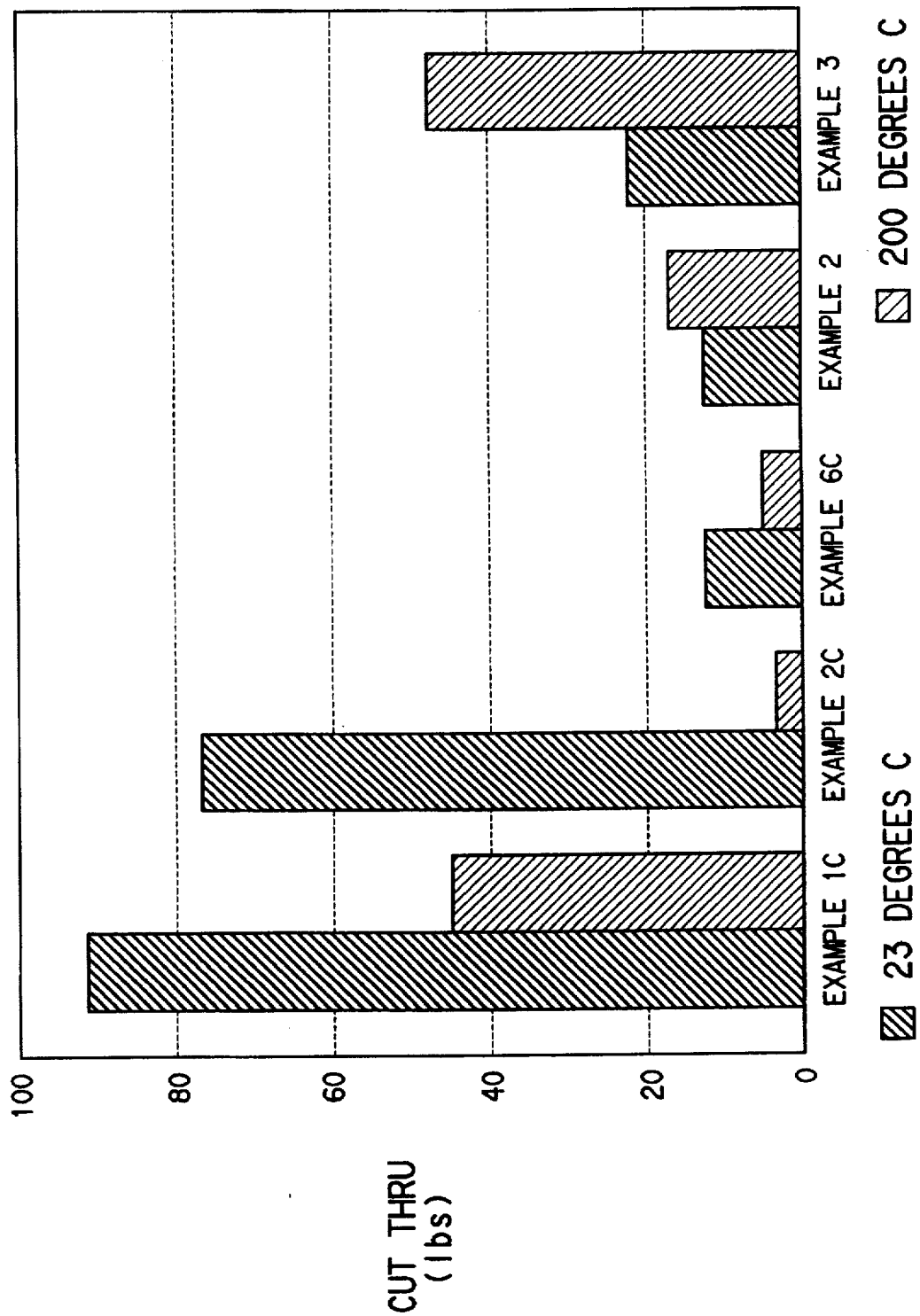

FIGS. 1 and 2 show the dynamic cut-through resistance values at 23° C. and 200° C. of various polyimide-fluoropolymer wire insulation constructions of the present invention (Examples 1 to 3) and the prior art (Comparative Examples 1C to 6C).

Referring to FIG. 1, Comparative Example 1C is a two-tape 20 AWG Military Specification wire construction (MIL-W-81381/9) having a polyimide topcoat. The conductor was a high-strength silver plated stranded conductor consisting of 19 strands of 32 AWG single conductor wire. The tape nearest to the conductor consisted of a 2 mil base layer of a polyimide derived from pyromellitic dianhydride and 4,4'-diamino-diphenyl ether bonded on one side to a 0.50 mil layer of Teflon® FEP. The polyimide layer was adjacent to the conductor and the tape was wrapped with a minimum of 50% overlap. The second tape in this construction was a polyimide tape consisting of a 1 mil base layer of a polyimide derived from pyromellitic dianhydride and 4,4'-diaminodiphenyl ether with a 0.10 mil thick layer of Teflon® FEP on each side which was wrapped over the first tape with a minimum of 50% overlap. A 1 mil thick topcoat of a polyimide derived from pyromellitic dianhydride and 4,4'-diaminodiphenyl ether, containing pigments to modify the color, was applied over the construction. The total insulated wire diameter ranged from 0.053 to 0.057 inch.

Comparative Example 2C is a two-tape 20 AWG Military Specification wire construction (MIL-W-22759/35) containing the same conductor used in comparative Example 1C described above. The insulation in this construction was a two-layer extrusion of ethylene-tetrafluoroethylene (ETFE) where both layers were irradiation cross-linked. The total insulated wire diameter ranged from 0.056 to 0.060 inch.

Both Comparative Examples 1C and 2C showed an inverse relationship between the test temperature and the dynamic cut-through resistance, which is the normally expected result for insulation constructions presently used in high temperature, thin-wall electrical insulation applications.

Comparative Example 3C is a two-tape insulation construction made using a nickel plated stranded copper conductor consisting of 19 strands of 32 AWG nickel plated copper wire. The tape next to the conductor was two mils thick and was wrapped on the conductor with a 50% minimum overlap. This tape consisted of a 1 mil thick base layer of a polyimide polymer derived from oxydiphthalic dianhydride and 1,3-(4-aminophenoxy)-benzene and a 0.50 mil fluoropolymer composite layer on each side of the polyimide polymer base layer consisting of successive layers of 0.05 mil of FEP, 0.40 mil of a blend of 90% PTFE and 10% FEP and 0.05 mil of FEP. The second tape was a 2 mil thick layer of unsintered PTFE which was overlayered on the first tape with a minimum of 50% overlap. The tapes were sealed and sintered in a radiant-heat convection oven to provide a continuous insulated wire construction with a wall thickness of approximately 7.5 mils.

Comparative Example 4C is a two-tape construction which is identical to Comparative Example 3C, except that the base polyimide layer consisted of a 1 mil thick layer of pyromellitic dianhydride and 4,4'-diaminodiphenyl ether.

Comparative Example 5C is a two-tape construction which is identical to Comparative Example 4C, except that the layer of pyromellitic dianhydride/4,4'-diaminodiphenyl ether polyimide was 0.75 mil thick instead of 1 mil thick. The total thickness of the fluoropolymer layer was also reduced from 0.50 mil to 0.375 mil and the top unsintered PTFE layer had a thickness of 1.5 mils instead of 2.0 mils. The final insulation wall thickness was approximately 6.0 mils.

Example 1 is a two-tape insulation construction of the present invention made using a nickel plated stranded copper conductor consisting of 19 strands of 32 AWG nickel plated copper wire. The tape next to the conductor was two mils thick and was wrapped on the conductor with a 50% minimum overlap. This tape consisted of a 0.50 mil thick base layer of a polyimide copolymer derived from 40 mole % of 3,3',4,4'-biphenyltetracarboxylic dianhydride, 60 mole % of pyromellitic dianhydride, 60 mole % of p-phenylene diamine and 40 mole % of 4,4'-diaminodiphenyl ether. A 0.50 mil thick fluoropolymer composite was formed on each side of the base polyimide copolymer layer by coating successive layers of 0.050 mil of FEP, 0.40 mil of a blend of 90% of PTFE and 10% of FEP and 0.05 mil of FEP on the polyimide copolymer layer. A second 2 mil thick tape of unsintered PTFE was overlayered on the first tape with a minimum of 50% overlap. The tapes were sealed and sintered in a radiant-heat convection oven to provide a continuous insulated wire construction.

Comparative Examples 3C to 5C all exhibit the same normal inverse relationship of the dynamic cut-through resistance as a function of the temperature expected for such insulation constructions. In contrast, Example 1 does not follow the normal inverse behavior, but exhibits a completely unexpected increase in cut-through resistance at elevated temperature (200° C.).

Referring to FIG. 2, Comparative Example 6C is a two-tape insulation construction made using a 20 AWG stranded (19/32) nickel plate copper conductor identical to the conductor used in Comparative Example 3C. The tape nearest the conductor was based on a 0.75 mil base layer of a polyimide derived from pyromellitic dianhydride and 4,4'-diaminodiphenyl ether which was coated on each side with a fluoropolymer. On the side of the tape closest to the conductor, the fluoropolymer coating consisted of a 0.10 mil layer of FEP next to the polyimide layer and, on top of this, a layer of a blend of 90% PTFE and 10% FEP having a thickness of approximately 0.55 mil. The fluoropolymer coating thickness on this side of the polyimide layer was approximately 0.65 mil. On the side of the tape opposite to the conductor, the fluoropolymer coating consisted of a 0.10 mil layer of FEP. The coating on the two sides of the polyimide plus the polyimide film itself resulted in a total thickness of approximately 1.5 mils. The second tape in this construction was a 1.5 mils thick unsintered PTFE tape containing pigments that gave color and ease of marking qualities to the wire. The two tapes were sintered and sealed in a radiant-heat convection oven to produce a cohesive electrical insulation.

Example 2 of the present invention was identical to Comparative Example 6C, except that the polyimide base layer was a 0.75 mil layer of a polyimide copolymer derived from 100 mole % of pyromellitic dianhydride, 60 mole % of p-phenylene diamine and 40 mole % of 4,4'-diaminodiphenyl ether.

Example 3 of the present invention was identical to Comparative Example 6C, except that the polyimide base layer was a 0.75 mil layer of a polyimide copolymer derived from 40 mole % of 3,3',4,4'-biphenyltetracarboxylic dianhydride, 60 mole % of pyromellitic dianhydride, 60 mole % of p-phenylenediamine and 40 mole of 4,4'-diaminodiphenyl ether.

Again, Comparative Example 6C exhibits the expected inverse relationship of cut-through resistance with temperature. In contrast, Examples 2 and 3 of the present invention use a high tensile strength, high modulus polyimide copolymer as the polyimide base layer and provide polyimide-fluoropolymer wire insulations that have unique and unexpected cut-through resistance properties.

What is claimed is:

1. A multilayer polyimide-fluoropolymer insulation structure having superior cut-through resistance comprising:
   (a) a first layer of a polyimide-fluoropolymer composite consisting essentially of:
      (i) a polyimide copolymer base layer consisting essentially of from 0 to 95 mole % of 3,3'4,4'-biphenyltetracarboxylic dianhydride, from 5 to 100 mole % of pyromellitic dianhydride, from 25 to 99 mole % of p-phenylenediamine and from 1 to 75 mole % of a diaminodiphenylether;
      (ii) a layer of a fluorinated ethylene-propylene copolymer (FEP) bonded to both sides of the polyimide copolymer base layer; and
      (iii) a layer of a blend of polytetrafluoroethylene polymer(PTFE) and fluorinated ethylene-propylene copolymer (FEP) bonded to the exposed side of one of the fluorinated ethylene-propylene copolymer (FEP) layers (ii); and
   (b) a second layer overlaying said first composite layer (a) of unsintered polytetrafluoroethylene (PTFE).

2. The multilayer polyimide-fluorpolymer insulation structure of claim 1 wherein blend layers (iii) of polytetrafluoroethylene polymer (PTFE) and fluorinated ethylene-propylene copolymer (FEP) are bonded to the exposed sides of both of the fluorinated ethylene-propylene copolymer (FEP) layers (ii).

3. The multilayer polyimide-fluoropolymer insulation structure of claim 2 further comprising (iv) layers of fluorinated ethylene-propylene copolymer (FEP) bonded to the exposed sides of the polytetrafluoroethylene-polymer (PTFE)-FEP blend layers (iii).

4. The multilayer polyimide-fluoropolymer insulation structure of claim 1 wherein the polyimide copolymer base layer comprises 40 mole % of 3,3',4,4'-biphenyltetracarboxylic dianhydride, 60 mole % of pyromellitic dianhydride, 60 mole % of p-phenylene diamine and 40 mole % of 4,4'-diaminodiphenylether.

5. The multilayer polyimide-fluoropolymer insulation structure of claim 1 wherein the polyimide copolymer base layer comprises 100 mole % of pyromellitic dianhydride, 60 mole % of p-phenylenediamine and 40 mole % of 4,4'-diaminodiphenylether.

6. The multilayer polyimide-fluoropolymer insulation structure of claim 1 wherein the PTFE-FEP blend layers comprise from 50 to 90% by weight of PTFE and from 10 to 50% by weight of FEP.

7. The multilayer polyimide-fluoropolymer insulation structure of claim 1 wherein the thickness of the polyimide copolymer base layer (i) ranges from 0.30 to 5.0 mils.

8. The multilayer polyimide-fluoropolymer insulation structure of claim 1 wherein the thickness of the fluorinated ethylene-propylene copolymer (FEP) layers (ii) ranges from 0.05 to 0.10 mil.

9. The multilayer polyimide-fluoropolymer insulation structure of claim 1 wherein the thickness of the layer of the blend of polytetrafluoroethylene (PTFE) and fluorinated ethylene-propylene copolymer (FEP) (iii) ranges from 0.25 to 0.55 mil.

10. The multilayer polyimide-fluoropolymer insulation structure of claim 1 wherein the thickness of the unsintered polytetrafluoroethylene layer (b) ranges from 1.0 to 3.0 mils.

* * * * *